US010702723B2

(12) United States Patent
Quigley et al.

(10) Patent No.: US 10,702,723 B2
(45) Date of Patent: Jul. 7, 2020

(54) HARNESS WITH STRUCTURAL TEAR TAPE

(71) Applicant: MSA Technology, LLC, Cranberry Township, PA (US)

(72) Inventors: Matthew Quigley, Pittsburgh, PA (US); Matthew Frederick Jacob, Pittsburgh, PA (US); Benjamin T. Sepe, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 0 days.

(21) Appl. No.: 15/376,191

(22) Filed: Dec. 12, 2016

(65) Prior Publication Data

US 2018/0161606 A1 Jun. 14, 2018

(51) Int. Cl.
*A62B 35/04* (2006.01)
*A62B 35/00* (2006.01)
*A62B 1/16* (2006.01)
*B60R 22/28* (2006.01)

(52) U.S. Cl.
CPC ........... *A62B 35/0025* (2013.01); *A62B 1/16* (2013.01); *A62B 35/0006* (2013.01); *A62B 35/0012* (2013.01); *A62B 35/0018* (2013.01); *A62B 35/04* (2013.01); *B60R 22/28* (2013.01)

(58) Field of Classification Search
CPC ........... A62B 35/0025; A62B 35/0006; A62B 35/0012; A62B 35/0018; A62B 35/04; A62B 1/16
See application file for complete search history.

(56) References Cited

U.S. PATENT DOCUMENTS

| | | | |
|---|---|---|---|
| 1,574,672 A * | 2/1926 | McCarroll-Doull | ........................ A47D 15/006 128/875 |
| 3,176,793 A * | 4/1965 | Hlacia | ................ A41D 13/0007 119/857 |
| 3,444,957 A | 5/1969 | Ervin, Jr. | |
| 4,512,437 A * | 4/1985 | Savage | .............. A62B 35/0018 119/857 |
| 4,518,026 A * | 5/1985 | Otto | ........................ E06B 3/827 160/201 |
| 4,712,513 A * | 12/1987 | Huppertsberg | .... A62B 35/0031 182/3 |
| 5,167,263 A | 12/1992 | Kelen et al. | |
| 5,279,386 A | 1/1994 | Cearley | |
| 5,287,943 A * | 2/1994 | Bell | ....................... A62B 35/04 182/3 |
| 6,006,860 A | 12/1999 | Bell | |
| 6,085,802 A | 7/2000 | Silberberg | |

(Continued)

FOREIGN PATENT DOCUMENTS

EP 2724752 B1 4/2014
WO 2007134746 A1 11/2007

*Primary Examiner* — Alvin C Chin-Shue
(74) *Attorney, Agent, or Firm* — The Webb Law Firm

(57) ABSTRACT

A harness configured for being removably attachable to a body of a user has an optional pair of leg straps, an optional belt strap, and a shoulder strap. The shoulder strap has a front portion attached to a front end of each leg strap and a rear portion attached to a rear end of each leg strap. At least a portion of the shoulder strap has an energy absorbing element formed integrally therein having a tearable webbing material with at least two bound, load-bearing webbing components configured to tear from one another.

20 Claims, 10 Drawing Sheets

(56) References Cited

U.S. PATENT DOCUMENTS

| | | | |
|---|---|---|---|
| 6,374,946 B1 * | 4/2002 | Petzl | A62B 35/0018 182/3 |
| 6,874,596 B2 * | 4/2005 | Zeissler | A62B 35/00 182/3 |
| 7,331,363 B2 | 2/2008 | Lanzi | |
| 7,662,575 B2 * | 2/2010 | Sikora | A61K 39/02 435/7.1 |
| 7,726,350 B2 | 6/2010 | Jennings et al. | |
| 8,356,691 B2 * | 1/2013 | Griffith | A62B 35/04 182/18 |
| 8,584,799 B1 | 11/2013 | Dennington | |
| 8,651,235 B2 | 2/2014 | Wood | |
| 8,959,664 B2 | 2/2015 | Johnson et al. | |
| 8,967,600 B2 | 3/2015 | Hede | |
| 8,997,317 B2 | 4/2015 | Rinklake | |
| 9,027,707 B2 * | 5/2015 | Schierenbeck | A62B 35/00 182/3 |
| 9,174,073 B2 | 11/2015 | Casebolt et al. | |
| 9,233,585 B1 | 1/2016 | Haynes | |
| 9,308,402 B2 | 4/2016 | Chevalier | |
| 9,387,350 B2 * | 7/2016 | Gopfert | A62B 35/0018 |
| 9,410,766 B1 | 8/2016 | Falla | |
| 9,808,659 B2 * | 11/2017 | Chevalier | A62B 35/0012 |
| 2005/0189169 A1 | 9/2005 | Tanaka et al. | |
| 2005/0269153 A1 | 12/2005 | Casebolt | |
| 2006/0048723 A1 | 3/2006 | Rohlf et al. | |
| 2006/0102423 A1 | 5/2006 | Lang et al. | |
| 2006/0169534 A1 | 8/2006 | Green | |
| 2007/0023231 A1 * | 2/2007 | Gorman | A62B 35/0018 182/3 |
| 2007/0209868 A1 | 9/2007 | Belcher et al. | |
| 2009/0057360 A1 | 3/2009 | Demsky | |
| 2009/0071750 A1 * | 3/2009 | Simard | A62B 1/14 182/5 |
| 2009/0114307 A1 * | 5/2009 | Jennings | A62B 35/04 139/415 |
| 2010/0025148 A1 * | 2/2010 | Dawson | A62B 35/0012 182/3 |
| 2011/0186603 A1 | 8/2011 | Alford | |
| 2013/0105246 A1 | 5/2013 | Schlangen et al. | |
| 2013/0292219 A1 | 11/2013 | Perner | |

* cited by examiner

HARNESS WITH STRUCTURAL TEAR TAPE

BACKGROUND OF THE INVENTION

Field of the Invention

The present invention relates generally to a harness used in a fall protection arrangement and, in particular, to a harness having at least one energy absorbing element, such as an energy absorbing element made from or having a tearable webbing material integrally formed into or as part of the harness.

Description of the Related Art

As is known in the art, there exist various mechanisms to provide assistance to a wearer or ensure the wearer's safety in certain situations. Such mechanisms come in many forms, including, but not limited to, harnesses and safety belts. Full body harnesses are widely used for lifting and lowering individuals in dangerous situations and as a primary component in a personal fall arrest system. These harnesses can also be used for work positioning, travel restriction, ladder climbing, rescue retrieval, and evacuation. While these harnesses are used mainly in an industrial setting, and particularly the construction industry where the likelihood and danger of falls from heights is both numerous and significant, a full body harness can be used in various other applications in which total suspension and support of the body must be ensured, either expectedly or unexpectedly.

While there are many variations in full body harness construction, all typically include a plurality of elongated straps that are combined together to fit around a user's body. In some embodiments or aspects, a full body harness may have an attachment point (e.g., a D-ring) positioned in a central portion of the user's back, and a plurality of straps routed around predetermined portions of the user's body in such manner as to hold or suspend the user in the event of a fall.

Full body harnesses, when used in a fall arrest situation, should always be used with an energy absorbing element. In some embodiments or aspects, the energy absorbing element may be a self-retracting lanyard (SRL), and in other embodiments or aspects may include a lanyard or a rope grab. The SRL is attached at one end to an anchor point and at its other end to a line directly connected to the user. The SRL is configured to activate once the user has begun to fall to arrest the fall soon enough to prevent injury to the user. Typically, an SRL has a housing with a rotatable drum having a line wound about the drum and a braking mechanism for controlling the rotation of the drum. The drum can rotate in a first direction to unwind (or "pay out") the line from the housing when a certain level of tension is deliberately applied. When tension is reduced or released, the drum can slowly rotate in a reverse direction, thereby causing the line to retract or rewind onto the drum. The braking mechanism is configured for slowing down and stopping the rotation of the drum when the line unwinds too rapidly. For example, the braking mechanism may be activated to brake the rotation of the drum when the rotation speed exceeds a predetermined velocity. A sudden line pay out that exceeds a normal pay out speed is an indication that the user has experienced a fall that needs to be stopped or arrested. Should such an unintentional, accidental fall commence, the braking mechanism in the housing of the SRL is configured to engage and stop the user from falling too far.

Many falls occur over the edge of a working surface, causing the line of the SRL to bend over the edge. In such situations, the line is not moved relative to the edge, thereby imparting the entire force of a fall on a single point on the line at the edge. If an energy absorbing element is not positioned between the user and the edge, there is a risk that the user will be exposed to dangerously high forces caused by a sudden deceleration of the user's body as the user's weight is supported by the harness and a line attaching the user to the anchor point. Some full body harnesses have an energy absorbing element permanently attached to the D-ring on the user's back, but this is often bulky and can interfere with the user's mobility and may add unnecessary weight that the user must carry at all times.

Accordingly, there is a need in the art for an improved harness that addresses certain drawbacks and deficiencies associated with known harnesses. For example, there is a need for an improved harness with an improved energy absorbing element associated with the harness. There is a further need in the art for an improved harness that can be easily and effectively worn by the user in a variety of work environments without compromising the user's ability to move and without adding additional weight that must be borne by the user. There is also a need for an improved harness with increased safety compliance at the worksite, and with more effective and safe support of the user in the event of a fall.

SUMMARY OF THE INVENTION

Generally, provided is an improved fall protection harness having an energy absorbing element integrally formed as part of the harness. Preferably, provided is an improved harness having an energy absorbing element, such as an energy absorbing element made from or including tearable webbing material. Preferably, provided is an improved harness that can be easily and effectively worn by the user in a variety of work environments without compromising the user's ability to move and without adding significant weight that must be borne by the user. Preferably, provided is an improved harness that not only leads to increased safety compliance at the worksite, but also provides increased effectiveness to the personal fall protection system and a resulting increase in the safety of the user in the event of a fall.

In some preferred and non-limiting embodiments or aspects, provided is a harness removably attachable to a body of a user. The harness may have a plurality of straps, optionally including a pair of leg straps, with each leg strap having a first end and a second end removably attached to each other and configured to be free floating when detached from each other. The harness may optionally further have a belt strap having a first end and a second end removably attached to each other and configured to be free floating when detached from each other. The harness includes a shoulder strap having a front portion and a rear portion. At least a portion of the shoulder strap may have an energy absorbing element formed integrally therein, the energy absorbing element having a tearable webbing material with at least two bound webbing components configured to tear from one another when the shoulder strap is subjected to a force that exceeds a predetermined threshold. Accordingly, at least a portion of the shoulder strap may comprise or be formed by or as an energy absorbing element.

In other preferred and non-limiting embodiments or aspects, the at least two bound webbing components may be bound by a plurality of binder threads. The plurality of binder threads may be configured to tear successively in a longitudinal direction of the shoulder strap when the shoulder strap is subjected to the force that exceeds the predetermined threshold. The plurality of binder threads may extend through at least a portion of a thickness of the at least two webbing components. The plurality of binder threads may be arranged in a row, or two or more rows extending along a longitudinal length or a lateral length of the webbing components. The rows may be substantially parallel to each other or intersect with each other at least once over the longitudinal length or a lateral length of the webbing components. The plurality of binder threads may be arranged in two or more thread groups spaced apart from each other along a longitudinal length or a lateral length of the webbing components. The two or more thread groups may be arranged in a pattern. A density of the plurality of binder threads may increase from the rear portion to the front portion of the shoulder strap, or vice versa. The predetermined threshold may be in the range of about 310 lbs to about 2,250 lbs. The at least two bound webbing components may also or alternatively be bound together by an adhesive. The shoulder strap may have a starting tear point at a rear portion where the at least two bound webbing components are unbound. The shoulder strap may have an ending tear point having a reinforced area configured to prevent separation of the at least two bound webbing components. The energy absorbing element may be formed on or as an energy absorbing area at the rear portion of the shoulder strap.

In other preferred and non-limiting embodiments or aspects, a harness may be removably attachable to a body of a user. The harness may have a plurality of straps, including a shoulder strap having a front portion and a rear portion. At least a portion of the shoulder strap may have an energy absorbing element formed integrally therewith and formed on an energy absorbing area at the rear portion of the shoulder strap, the energy absorbing element having a tearable webbing material with at least two bound webbing components configured to tear from one another when the shoulder strap is subjected to a force that exceeds a predetermined threshold. The at least two bound webbing components may be bound by a plurality of binder threads configured to tear successively in a longitudinal direction of the shoulder strap when the shoulder strap is subject to the force. The shoulder strap may have a starting tear area at the rear portion where the at least two bound webbing components are unbound. Optionally, the harness may have a pair of leg straps and/or a belt strap.

In other preferred and non-limiting embodiments or aspects, at least one strap in a harness removably attachable to a body of a user may have a shoulder strap configured as a loop. At least a portion of the shoulder strap may have an energy absorbing element formed integrally therein, the energy absorbing element having a tearable webbing material with at least two bound webbing components configured to tear from one another when the shoulder strap is subjected to a force that exceeds a predetermined threshold. The at least two bound webbing components may be bound by a plurality of binder threads configured to tear successively in a longitudinal direction of the shoulder strap when the shoulder strap is subjected to a force that exceeds the predetermined threshold.

Further preferred and non-limiting embodiments or aspects will now be set forth in the following numbered clauses.

Clause 1: A harness removably attachable to a body of a user, the harness having a plurality of straps comprising: an optional pair of leg straps, each leg strap having a first end and a second end removably attached to each other and configured to be free floating when detached from each other; an optional belt strap having a first end and a second end removably attached to each other and configured to be free floating when detached from each other; and a shoulder strap having a front portion and a rear portion, wherein at least a portion of the shoulder strap comprises an energy absorbing element formed integrally therein, the energy absorbing element having a tearable webbing material with at least two bound webbing components configured to tear from one another when the shoulder strap is subjected to a force that exceeds a predetermined threshold.

Clause 2: The harness of clause 1, wherein the at least two bound webbing components are bound by a plurality of binder threads.

Clause 3: The harness of clause 1 or 2, wherein the plurality of binder threads are configured to tear successively in a longitudinal direction of the shoulder strap when the shoulder strap is subjected to the force that exceeds the predetermined threshold.

Clause 4: The harness of any of clauses 1-3, wherein the plurality of binder threads extend through at least a portion of a thickness of the at least two webbing components.

Clause 5: The harness of any of clauses 1-4, wherein the plurality of binder threads are arranged in two or more rows extending along a longitudinal length or a lateral length of the webbing components.

Clause 6: The harness of any of clauses 1-5, wherein the rows are substantially parallel to each other.

Clause 7: The harness of any of clauses 1-6, wherein the rows intersect with each other at least once over the longitudinal length or a lateral length of the webbing components.

Clause 8: The harness of any of clauses 1-7, wherein the plurality of binder threads are arranged in two or more thread groups spaced apart from each other along a longitudinal length or a lateral length of the webbing components.

Clause 9: The harness of any of clauses 1-8, wherein the two or more thread groups are arranged in a pattern.

Clause 10: The harness of any of clauses 1-9, wherein a density of the plurality of binder threads increases from the rear portion to the front portion of the shoulder strap.

Clause 11: The harness of any of clauses 1-10, wherein the predetermined threshold is in the range of about 310 lbs to about 2,250 lbs.

Clause 12: The harness of any of clauses 1-11, wherein the at least two bound webbing components are bound together by an adhesive.

Clause 13: The harness of any of clauses 1-12, wherein the shoulder strap has a starting tear point at a rear portion where the at least two bound webbing components are unbound.

Clause 14: The harness of any of clauses 1-13, wherein the shoulder strap has an ending tear point having a reinforced area configured to prevent separation of the at least two bound webbing components.

Clause 15: The harness of any of clauses 1-14, wherein the energy absorbing element is formed on an energy absorbing area at the rear portion of the shoulder strap.

Clause 16: The harness of any of clauses 1-15, wherein the shoulder strap comprises an anchor element associated with the rear portion, the anchor element having a frame with a first opening for receiving the shoulder strap and a second opening for connecting to a line connected to an anchor point.

Clause 17: A harness removably attachable to a body of a user, the harness having a plurality of straps comprising: an optional pair of leg straps, each leg strap having a first end and a second end removably attached to each other and configured to be free floating when detached from each other; an optional belt strap having a first end and a second end removably attached to each other and configured to be free floating when detached from each other; and a shoulder strap having a front portion and a rear portion, wherein at least a portion of the shoulder strap comprises an energy absorbing element formed integrally therewith and formed on an energy absorbing area at the rear portion of the shoulder strap, the energy absorbing element having a tearable webbing material with at least two bound, load-bearing webbing components configured to tear from one another when the shoulder strap is subjected to a force that exceeds a predetermined threshold, and wherein the at least two bound webbing components are bound by a plurality of binder threads configured to tear successively in a longitudinal direction of the shoulder strap when the shoulder strap is subjected to the force.

Clause 18: The harness of clause 17, wherein the shoulder strap has a starting tear area at the rear portion where the at least two bound webbing components are unbound.

Clause 19: At least one strap in a harness removably attachable to a body of a user, the at least one strap comprising: a shoulder strap configured as a loop, wherein at least a portion of the shoulder strap comprises an energy absorbing element therein having a tearable webbing material with at least two bound webbing components configured to tear from one another when the shoulder strap is subjected to a force that exceeds a predetermined threshold.

Clause 20: The harness of clause 19, wherein the at least two bound webbing components are bound by a plurality of binder threads configured to tear successively in a longitudinal direction of the shoulder strap when the shoulder strap is subjected to the force that exceeds the predetermined threshold.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF THE PREFERRED EMBODIMENTS

Figure 1:
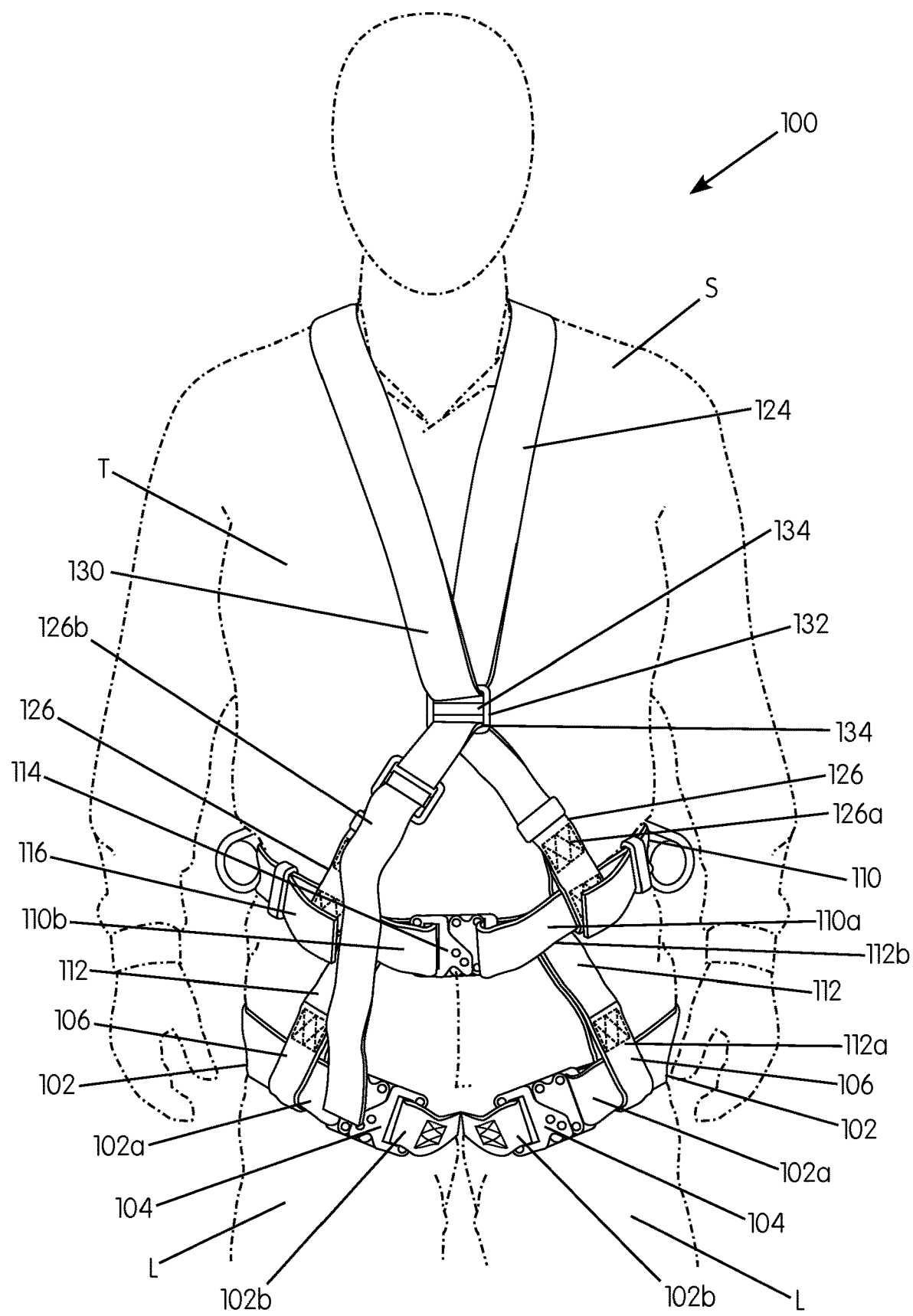
FIG. 1 is a front view of a user wearing a harness according to the principles of one preferred and non-limiting embodiment or aspect of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used in the specification and the claims, the singular form of "a", "an", and "the" include plural referents unless the context clearly dictates otherwise. As used in the specification and the claims, the term "end" refers to the extreme distal portion or the area near or adjacent that portion. Unless otherwise specified, the use of the term "attach", "attachable", and/or "attachment" includes a permanent, semi-permanent, removable, or adjustable attaching arrangement. As used in the specification and the claims, the term "integral" or "integrally" means that one component, such as an energy absorbing element, is formed as an essential constituent or part of another component, such as a shoulder harness, such that the two components together constitute a whole. As used in the specification and the claims, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used in the specification and the claims, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all sub-ranges or sub-ratios beginning with a minimum value of 1 or more and ending with a maximum value of 10 or less, such as but not limited to, 1 to 6.1, 3.5 to 7.8, and 5.5 to 10.

Figure 2:
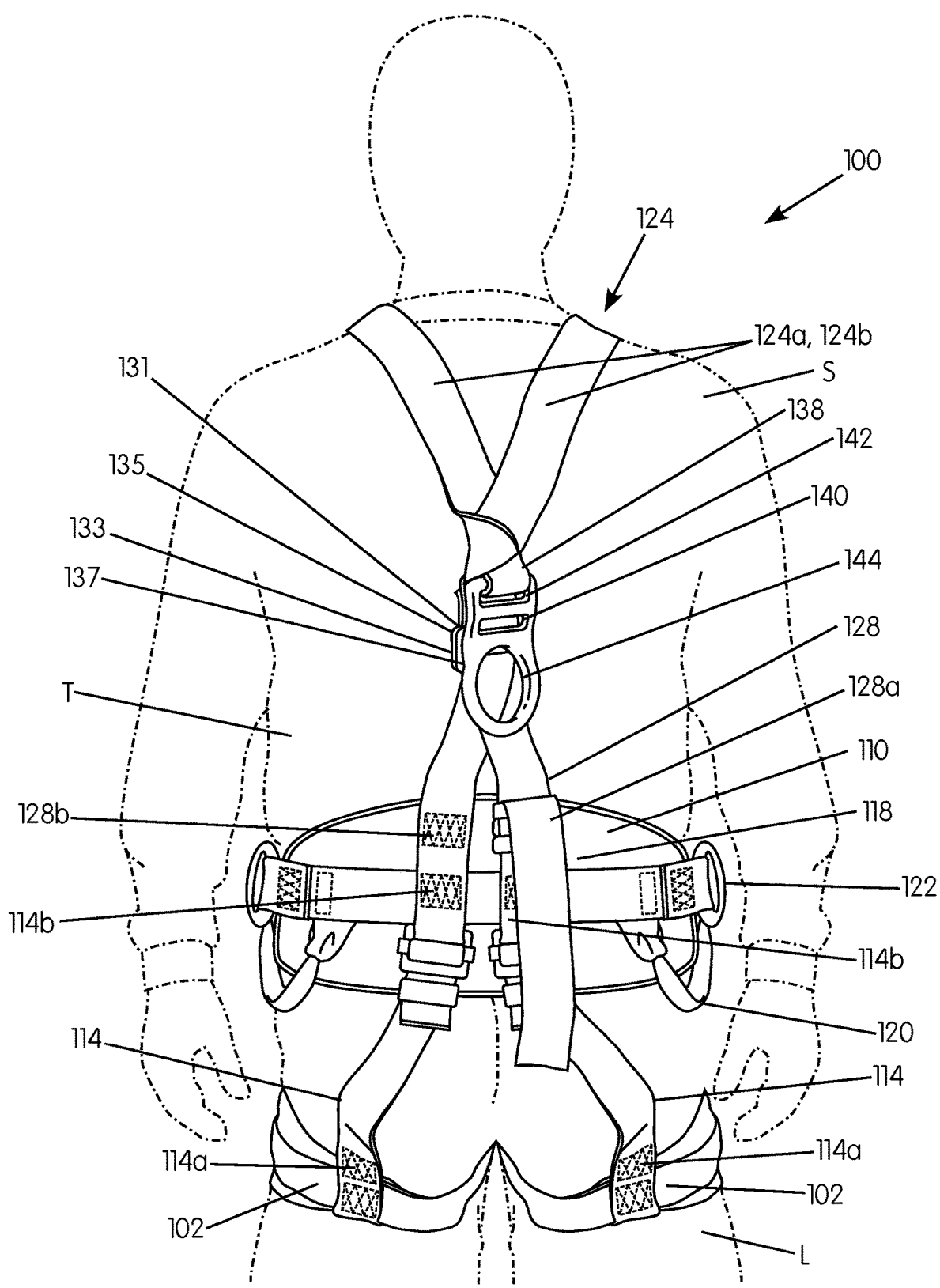
FIG. 2 is a rear view of the user wearing the harness shown in FIG. 1.
Figure 3:
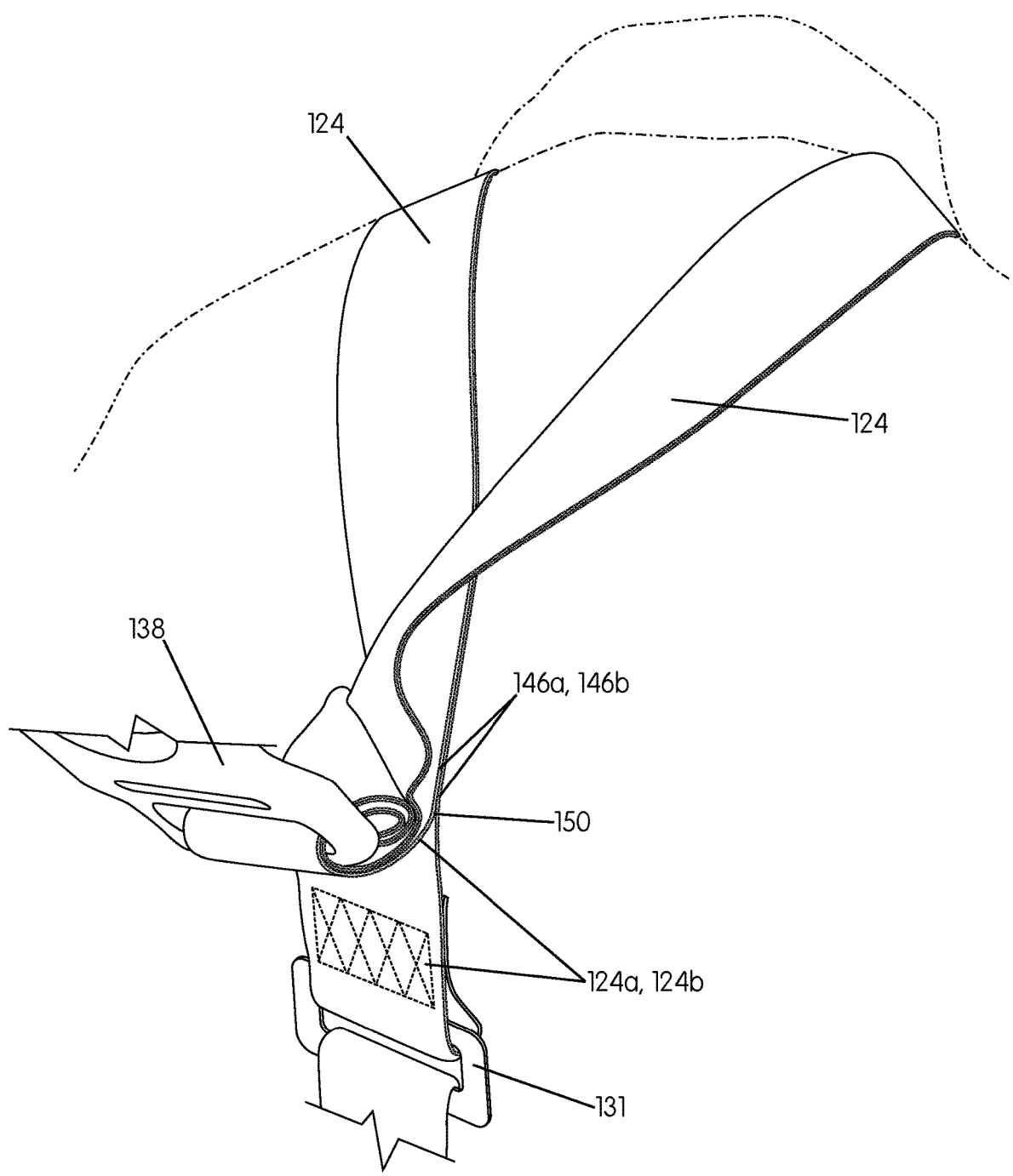
FIG. 3 is a detailed perspective view of an energy absorbing element configured for use with the harness shown in FIG. 1 with the energy absorbing element shown in a first configuration.

In various preferred and non-limiting embodiments or aspects, and with reference to FIGS. 1-3, the present disclosure is directed to a harness 100 used in a fall protection arrangement. As discussed herein, the harness 100 has at least one structural energy absorbing element formed integrally therewith and made from a tearable webbing material configured for absorbing energy during a fall event. In various preferred and non-limiting embodiments or aspects, the harness 100 may be used in combination with a supplementary energy absorbing element, such as a self-retracting lanyard (SRL) (not shown), to provide additional energy absorption during a fall event.

With continued reference to FIGS. 1-2, the harness 100 has a pair of leg straps 102 configured to attach around a user's legs L below a user's groin area. When attached, the leg straps 102 loop around or encircle each of the user's legs L. Each leg strap 102 has a first end 102a that is removably attachable to a second end 102b via connector 104. In some preferred and non-limiting embodiments or aspects, the connector 104 may be a clip, a buckle, a mating arrangement, an actuatable structure, or the like. The connector 104 permits removable attachment of the first end 102a to the second end 102b of each leg strap 102. In this manner, the first and second ends 102a, 102b of the leg straps 102 are configured to be removably attached to each other and configured to be free floating when detached from each other. In some preferred and non-limiting embodiments or aspects, at least one connector 104 and/or the leg strap 102 may have at least one adjustment mechanism 106 configured for adjusting the length of each leg strap 102. In this manner, the at least one adjustment mechanism 106 adjusts a distance between the first end 102a and the second end 102b such that each leg strap 102 may be adjusted to fit comfortably around the user's legs L. Each leg strap 102 may be formed from a webbing material typically used in harness construction.

In various preferred and non-limiting embodiments or aspects of the present disclosure, the leg straps 102 (or, indeed, any of the straps in the harness 100) may be linear lengths of material, folded straps that form loops with the at least one connector 104 at the first end 102a and/or the second end 102b, or the like. For example, as shown in FIG. 1, the connector 104 may have a first portion 104a that is non-adjustably attached to the first end 102a of at least one leg strap 102, while a second portion 104b of the connector 104 is adjustably secured at the second end 102b of at least one leg strap 102 through a loop of the material that makes up the leg strap 102. Therefore, in such an arrangement, the second portion 104b of the connector 104 and the loop of material that makes up the leg strap 102 at the second end 102b defines the at least one adjustment mechanism 106 for adjusting a length of the leg strap 102. It should be noted that the position of the adjustment mechanism 106 may be reversed such that the second portion 104b of the connector 104 is provided on the first end 102a of the leg strap 102. At least one leg strap 102 may have padding 108 for increasing the user's comfort while wearing the harness 100.

With continued reference to FIGS. 1-2, each leg strap 102 is connected to a belt strap 110 by a front leg connection strap 112 and a rear leg connection strap 114. With specific reference to FIG. 1, each front leg connection strap 112 has a first end 112a that is connected to the leg strap 102 and a second end 112b that is connected to the belt strap 110 at a front end of the belt strap 110. In some preferred and non-limiting embodiments or aspects, the first end 112a of at least one front leg connection strap 112 may be connected to the leg strap 102 in a loop configuration such that the first end 112a encircles the leg strap 102 to allow the front leg connection strap 112 to slidably move along a front portion of the leg strap 102. In this manner, the position of the front leg connection strap 112 may be adjusted relative to the leg strap 102 to increase the user's comfort while wearing the harness 100. In other preferred and non-limiting embodiments or aspects, the first end 112a of at least one front leg connection strap 112 may be directly and non-movably connected to the leg strap 102, such as being sewn directly to the leg strap 102. In some preferred and non-limiting embodiments or aspects, the second end 112b of at least one front leg connection strap 112 may be connected to the belt strap 110 in a loop configuration such that the second end 112b encircles the belt strap 110 to allow the front leg connection strap 112 to slidably move along a front portion of the belt strap 110. In this manner, the position of the front leg connection strap 112 may be adjusted relative to the belt strap 110 to increase the user's comfort while wearing the harness 100. In other preferred and non-limiting embodiments or aspects, the second end 112b of at least one front leg connection strap 112 may be directly and non-movably connected to the belt strap 110, such as being sewn directly to the belt strap 110. The length of each front leg connection strap 112 may be fixed (i.e., non-adjustable), or adjustable, such as by an adjustment mechanism similar to the adjustment mechanism 106 described herein with reference to the leg straps 102. Each front leg connection strap 112 may be formed from a webbing material typically used in harness construction.

The belt strap 110 is configured to encircle a lower portion of the user's torso T. The belt strap 110 has a first end 110a that is removably attachable to a second 110b via connector 114. In some preferred and non-limiting embodiments or aspects, the connector 114 may be a clip, a buckle, a mating arrangement, an actuatable structure, or the like. The connector 114 permits removable attachment of the first end 110a to the second end 110b of the belt strap 110. In this manner, the first and second ends 110a, 110b of the belt strap 110 are configured to be removably attached to each other and configured to be free floating when detached from each other.

In some preferred and non-limiting embodiments or aspects, at least one connector 114 and/or the leg strap 102 may have at least one adjustment mechanism 116 configured for, adjusting the length of the belt strap 110. Accordingly, the at least one adjustment mechanism 116 adjusts a distance between the first end 110a and the second end 110b such that the belt strap 110 may be adjusted to fit comfortably around the lower portion of the user's torso T. One or more handles 120, connection members 122, and other handling and/or connectors (shown in FIG. 2) may be provided on at least a portion of the belt strap 110. As shown in FIG. 2, the belt strap 110, may have padding 118 for increasing the user's comfort while wearing the harness 100. The belt strap 110 may be formed from a webbing material typically used in harness construction.

With specific reference to FIG. 2, each rear leg connection strap 114 has a first end 114a that is connected to the leg strap 102 and a second end 114b that is connected to the belt strap 110 at a rear end of the belt strap 110. In some preferred and non-limiting embodiments or aspects, the first end 114a of at least one rear leg connection strap 114 may be directly and non-movably connected to the leg strap 102, such as being sewn directly to the leg strap 102. In other preferred and non-limiting embodiments or aspects, the first end 114*a* of at least one rear leg connection strap 114 may be connected to the leg strap 102 in a loop configuration, such that the first end 114*a* encircles the leg strap 102 to allow the rear leg connection strap 114 to slidably move along a rear portion of the leg strap 102. In this manner, the position of the rear leg connection strap 114 may be adjusted relative to the leg strap 102 to increase the user's comfort while wearing the harness 100. The second end 114*b* of at least one rear leg connection strap 114 may be directly and non-movably connected to the belt strap 110, such as being sewn directly to the belt strap 110. In other preferred and non-limiting embodiments or aspects, the second end 114*b* of at least one rear leg connection strap 114 may be connected to the belt strap 110 in a loop configuration such that the second end 114*b* encircles the belt strap 110 to allow the rear leg connection strap 114 to slidably move along a rear portion of the belt strap 110. Accordingly, the position of the rear leg connection strap 114 may be adjusted relative to the belt strap 110 to increase the user's comfort while wearing the harness 100. The length of each rear leg connection strap 114 may be fixed (i.e., non-adjustable), or adjustable, such as by an adjustment mechanism similar to the adjustment mechanism 106 described herein with reference to the leg straps 102. Each rear leg connection strap 114 may be formed from a webbing material typically used in harness construction.

With continued reference to FIGS. 1-2, the harness 100 further has a shoulder strap 124 configured to extend over at least a portion of the user's shoulders S. The shoulder strap 124 may be a pair of shoulder straps connected to the belt strap 110 by way of a front shoulder connection strap 126 and a rear shoulder connection strap 128. With specific reference to FIG. 1, the front shoulder connection strap 126 has a first end 126*a* that is connected to a first portion of the belt strap 110 at a front end of the belt strap 110 and/or to a first of the pair of front leg connection straps 112. The front shoulder connection strap 126 further has a second end 126*b* that is connected to a second portion of the belt strap 110 at the front end of the belt strap 110 and/or to a second of the pair of front leg connection straps 112. In some preferred and non-limiting embodiments or aspects, the first end 126*a* and the second end 126*b* of the front shoulder connection strap 126 are directly connected to the front portion of the belt strap 110 and/or the pair of front leg connection straps 112, such as being sewn directly to the belt strap 110 and/or the pair of front leg connection straps 112. The length of the front shoulder connection strap 126 may be fixed (i.e., non-adjustable), or adjustable, such as by an adjustment mechanism similar to the adjustment mechanism 106 described herein with reference to the leg straps 102. The front shoulder connection strap 126 may be formed from a webbing material typically used in harness construction.

With continued reference to FIG. 1, the front shoulder connection strap 126 may have a front connection element 130 for connecting the shoulder strap 124 to the front shoulder connection strap 126. In use, the front connection element 130 may be positioned at a mid-point of the front shoulder connection strap 126 between the first end 126*a* and the second end 126*b*. In some preferred and non-limiting embodiments or aspects, the shoulder strap 124 and/or the front shoulder connection strap 126 may be looped around or otherwise permanently attached to the front connection element 130. The front connection element 130 has a frame 132 defining at least one opening through which the shoulder strap 124 and/or the front shoulder connection strap 126 may be looped around. In some preferred and non-limiting embodiments or aspects, the frame 132 of the front connection element 130 has a first opening 134 through which the front shoulder connection strap 126 extends and a second opening 136 through which the shoulder strap 124 extends.

With specific reference to FIG. 2, the rear shoulder connection strap 128 has a first end 128*a* that is connected to a first portion of the belt strap 110 at a rear end of the belt strap 110 and/or to a first of the pair of rear leg connection straps 114. The rear shoulder connection strap 128 further has a second end 128*b* that is connected to a second portion of the belt strap 110 at the rear end of the belt strap 110 and/or to a second of the pair of rear leg connection straps 114. In some preferred and non-limiting embodiments or aspects, the first end 128*a* and the second end 128*b* of the rear shoulder connection strap 128 are directly connected to the rear portion of the belt strap 110 and/or the pair of rear leg connection straps 114, such as being sewn directly to the belt strap 110 and/or the pair of rear leg connection straps 114. The length of the rear shoulder connection strap 128 may be fixed (i.e., non-adjustable), or adjustable, such as by an adjustment mechanism similar to the adjustment mechanism 106 described herein with reference to the leg straps 102. The rear shoulder connection strap 128 may be formed from a webbing material typically used in harness construction.

With continued reference to FIG. 2, the rear shoulder connection strap 128 may have a rear connection element 131 for connecting the shoulder strap 124 to the rear shoulder connection strap 128. In use, the rear connection element 131 may be positioned at a mid-point of the rear shoulder connection strap 128 between the first end 128*a* and the second end 128*b*. In some preferred and non-limiting embodiments or aspects, the shoulder strap 124 and/or the rear shoulder connection strap 128 may be looped around or otherwise permanently attached to the rear connection element 131. The rear connection element 131 has a frame 133 defining at least one opening through which at least one of the shoulder straps 124 and/or the rear shoulder connection strap 128 may be looped around. In some preferred and non-limiting embodiments or aspects, the frame 133 of the rear connection element 131 has a first opening 135 through which the rear shoulder connection strap 128 extends and a second opening 137 through which at least one of the shoulder straps 124 extends.

With reference to FIG. 2, the shoulder strap 124 has a first end 124*a* and a second end 124*b* connected to each other to form a loop. The loop has a front portion attached to a front end of the belt strap 110 and a rear portion attached to a rear end of the belt strap 110. In some preferred and non-limiting embodiments or aspects, the first end 124*a* and the second end 124*b* may be sewn together around the second opening 137 of the rear connection element 131. At a front end of the harness 100, the shoulder strap 124 is attached to the front connection element 130 by looping the material of the shoulder strap 124 through the second opening 136 of the front connection element 130. In other preferred and non-limiting examples, the first end 124*a* and the second end 124*b* of the shoulder strap 124 may be connected to one or more other straps of the harness 100, instead of being connected to each other.

With continued reference to FIG. 2, the shoulder strap 124 has an anchor element, such as a D-ring 138, for connecting at least a portion of the shoulder strap 124 to a line connected to an anchor point. In some preferred and non-limiting embodiments or aspects, at least a portion of the shoulder strap 124 is looped around or otherwise permanently attached to the D-ring 138. The D-ring 138 has a frame 140 defining at least one opening through which the shoulder strap 124 may be looped around. In some preferred and non-limiting embodiments or aspects, the frame 140 of the D-ring 138 has a first opening 142 through which the shoulder strap 124 extends. The shoulder strap 124 may be permanently sewed around the first opening 142, such that the shoulder strap 124 is not removable from the D-ring 138. The D-ring further has a second opening 144 which may be used to secure the clip, such as a carabiner, of a lanyard or other rope or line between the harness 100 and the anchor point (or secure other items to the harness 100).

Figure 5A:
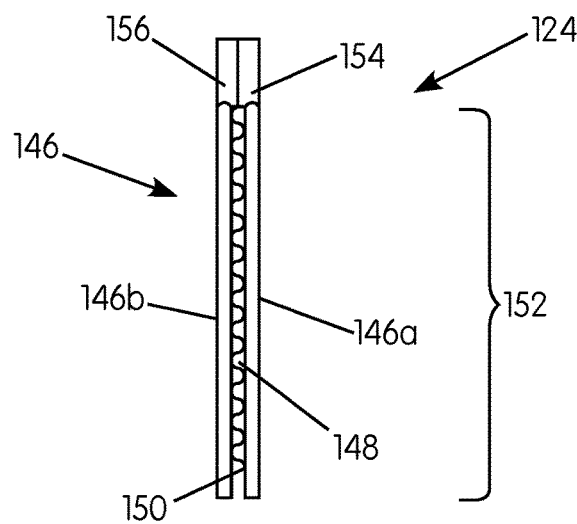
FIG. 5A is a schematic representation of the energy absorbing element prior to activation due to a predetermined force.
Figure 5B:
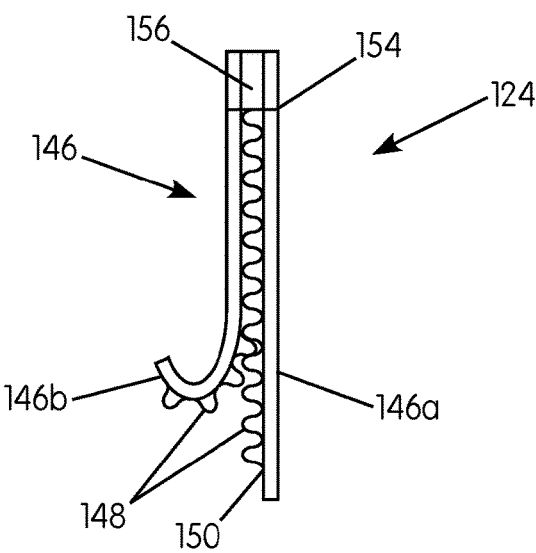
FIG. 5B is a schematic representation of the energy absorbing element during activation due to a predetermined force.
Figure 5C:
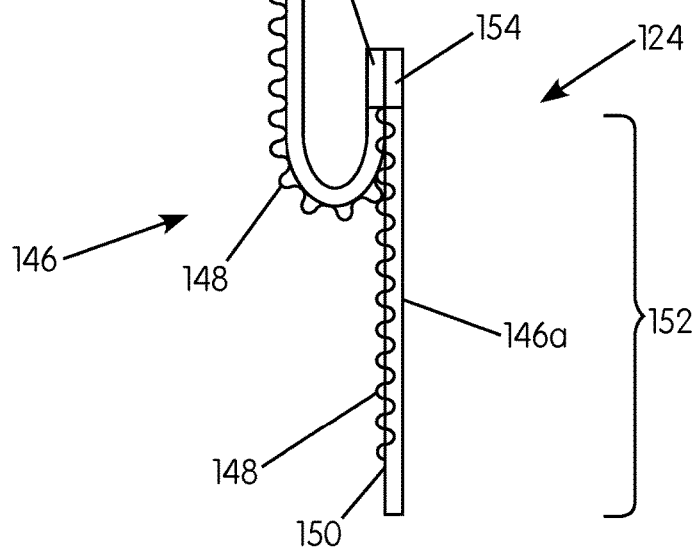
FIG. 5C is a schematic representation of the energy absorbing element after activation due to a predetermined force.

In some preferred and non-limiting embodiments or aspects, the shoulder strap 124 has an energy absorbing element formed integrally therein. For example, the shoulder strap 124 may be constructed from a tearable webbing material, such as an energy absorbing tear tape. With reference to FIGS. 5A-5C, the shoulder strap 124 is made from a webbing material 146 having two load-bearing webbing components 146a, 146b that are woven together by binder threads 148. In some embodiments or aspects, the webbing material 146 may have a plurality of load-bearing webbing components. The webbing components 146a, 146b may each be made from a two ply webbing material constructed from high tenacity polyester yarns. Each webbing component 146a, 146b may have a face ply and a back ply. The webbing components 146a, 146b may be superimposed over one another such that the back ply of one of the webbing components 146a, 146b is positioned over the face ply of the other of the webbing components 146a, 146b. In a first configuration, such as shown in FIG. 3 and FIG. 5A, the webbing components 146a, 146b and the binder threads 148 are woven together to constitute a single-piece webbing material, i.e., the shoulder strap 124. While the present disclosure describes binder threads 148 as a means of integrally bonding the webbing components 146a, 146b together, other suitable bonding means, such as hook-and-loop fasteners, adhesives, or other energy absorbing materials may also be used, either individually or in combination with the binder threads 148.

Figure 4:
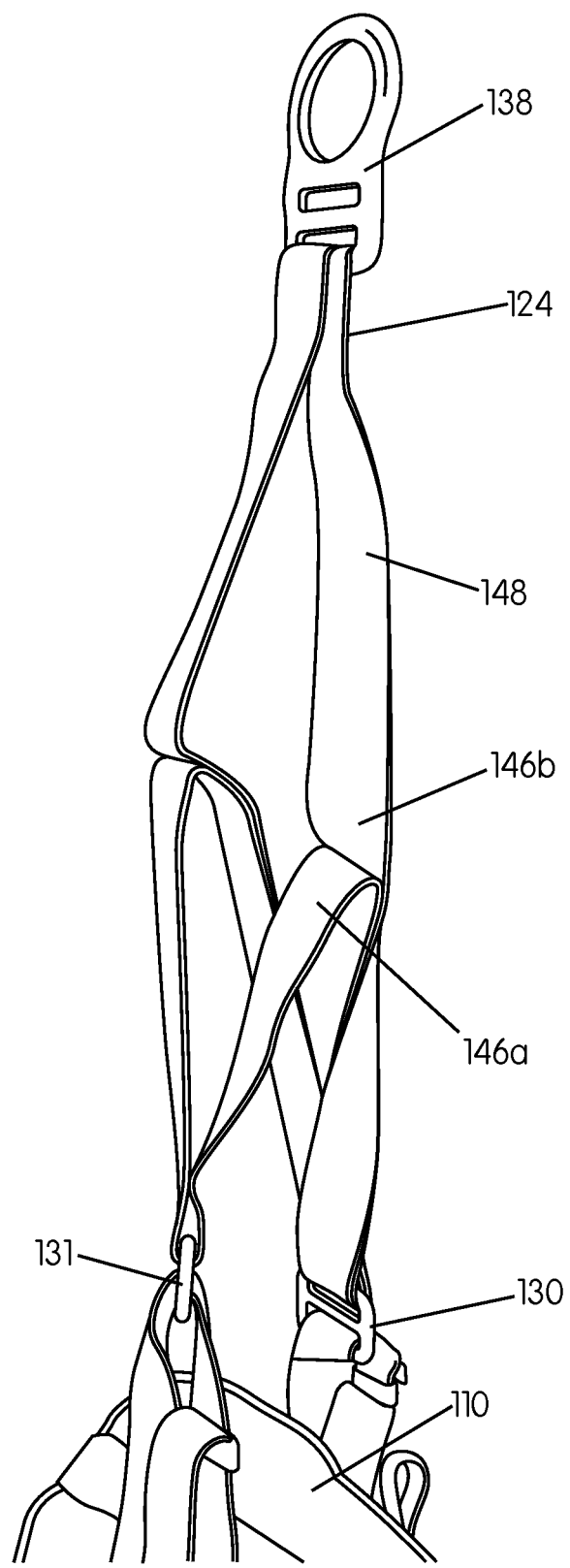
FIG. 4 is a detailed perspective view of the energy absorbing element configured for use with the harness shown in FIG. 1 with the energy absorbing element shown in a second configuration.

When the shoulder strap 124 is activated, such as during a fall event, the binder threads 148 are configured to be torn upon experiencing a force in excess of a predetermined force directed in a vertical direction, thereby allowing the two webbing components 146a, 146b to tear apart from each other, such as shown in FIG. 4 and FIG. 5C. In some embodiments or aspects, the predetermined force (load) may be in the range of about 310 lbs to about 2,250 lbs. The binder threads 148 are configured to absorb energy (force) of a user falling during a fall event by fracturing (or tearing/separating) and allowing the webbing components 146a, 146b to separate from each other. The tearing of the binder threads 148 may be initiated by a minimum predetermined force (load), such as about 310 lbs. The tearing of the binder threads 148, and a consequent separation of the webbing components 146a, 146b continues as long as the force on the harness 100 exceeds the minimum predetermined force and ends when either (1) the webbing components 146a, 146b reach an ending point; or (2) the force reduces to a point below the minimum predetermined force. In various preferred and non-limiting embodiments or aspects, the shoulder strap 124 may be configured to tear the webbing components 146a, 146b apart from each other due to breaking of the binder threads 148 at a constant force. The minimum predetermined force (load) required to break the binder threads 148 may be configurable by increasing or decreasing the density of the binder threads 148 per unit area, increasing or decreasing the width of the shoulder strap 124, increasing or decreasing the density of the binder threads 148 along a longitudinal length and/or a lateral length of the shoulder strap 124, and/or selecting a type of thread having specified strength characteristics.

As discussed above, and in another preferred and non-limiting embodiment or aspect, the webbing components 146a, 146b may be bound together by an adhesive, such as glue, that separates when reaching the minimum predetermined force or load. It is recognized that these adhesives may be specifically formulated to meet the separation requirements at the minimum predetermined force or load.

The binder threads 148 may extend through at least a portion of a thickness of at least one of the webbing components 146a, 146b. For example, the binder threads 148 may extend between the face ply and the back ply of each of the webbing components 146a, 146b. In some preferred and non-limiting embodiments or aspects, the binder threads 148 extend though the entire thickness of each of the webbing components 146a, 146b. The binder threads 148 may be woven in two or more rows extending along a longitudinal length and/or a lateral length of the webbing components 146a, 146b. In various preferred and non-limiting embodiments or aspects, the rows may be substantially parallel to each other, or intersect at least once with each other along the longitudinal length and/or the lateral length of the webbing components 146a, 146b. The binder threads 148 may be arranged in a plurality of thread groups arranged in a pattern on the webbing components 146a, 146b. In some preferred and non-limiting embodiments or aspects, the density of thread groups may be constant along the longitudinal length and/or the lateral length of the webbing components 146a, 146b. In this manner, the webbing components 146a, 146a will separate from one another due to breaking of the binder threads 148 at a constant rate at a given force that exceeds the minimum predetermined force. In other preferred and non-limiting embodiments or aspects, the density of thread groups may vary along the longitudinal length and/or the lateral length of the webbing components 146a, 146b, such as by increasing or decreasing the density of the thread groups. Accordingly, the webbing components 146a, 146a will separate from one another due to breaking of the binder threads 148 at an increasing or decreasing rate at a given force that exceeds the minimum predetermined force. The arrangement of the thread groups may be selected to optimize the tear-away force required to break the binder threads 148 (or adhesive) during separation of the webbing components 146a, 146b from each other. In various preferred and non-limiting embodiments or aspects, the binder threads 148 extend continuously between the webbing components 146a, 146b in a sinusoidal manner. The binder threads 148 may be made from high tenacity polyester yarns, nylon, or other suitable materials. The tensile strength of the binder threads 148 is desirably selected to be less than that of the webbing components 146a, 146b to allow the binder threads 148 to tear without tearing the webbing components 146a, 146b.

With reference to FIGS. 3 and 5A, the shoulder strap 124 may have a starting tear point 150 at which the two webbing components 146a, 146b are not bound by the binder threads 148. The staring tear point 150 may be defined proximate to the first and second ends 124, 124b of the shoulder strap 124. After the starting tear point 150, the webbing components 146a, 146b are integrally woven together by the binder threads 148. With reference to FIG. 5B, as the user falls during a fall event, the binder threads 148 start to fracture (or tear) at the starting tear point 150 and continue tearing along the longitudinal length of an energy absorbing area 152 of the shoulder strap 124 that ties the webbing components 146a, 146b with the binder threads 148. The binder threads 148 are configured to tear successively along the longitudinal length of the bound area 152 beginning from the starting tear point 150. The successive tearing of the binder threads 148 absorbs energy of the fall, thereby safely decelerating the user and reducing the shock transferred to the user's body as the user's weight is borne by the harness.

With reference to FIG. 5C, the shoulder harness 124 may have an ending tear point 154 at an end of the energy absorbing area 152. The ending tear point 154 may have a reinforced area 156, such as by additional stitching, to prevent further tearing of the webbing components 146a, 146b. FIG. 5C shows the shoulder harness 124 where the two webbing components 146a, 146b have been completely separated from each other after absorbing the energy of a fall event. In this configuration, the two webbing components 146a, 146b support the user's weight, such as with one of the webbing components 146a, 146b being connected to the D-ring 138, and the other of the two webbing components 146a, 146b supporting the user's shoulders. The tearing of the two webbing components 146a, 146b due to breaking of the binder threads 148 may end prior to the ending tear point 154 if the force on the harness is reduced below the minimum predetermined force necessary to tear the binder threads 148.

As described herein, the shoulder strap 124 having an energy absorbing element formed therein, such as the two webbing components 146a, 146b bound by binding threads 148, reduces the risk of misuse, especially in leading edge applications where the user may incorrectly install an energy absorbing element on a conventional harness. A harness 100 having such a shoulder strap 124 eliminates the need for a structural back-up strap as the tear tape maintains static strength of structural webbing at full elongation (end of deployment shown in FIG. 5C). In this manner, the harness 100 does not differ externally from a conventional harness without the energy absorbing element, but incorporates a beneficial energy absorption element into the harness 100 itself.

Figure 6A:
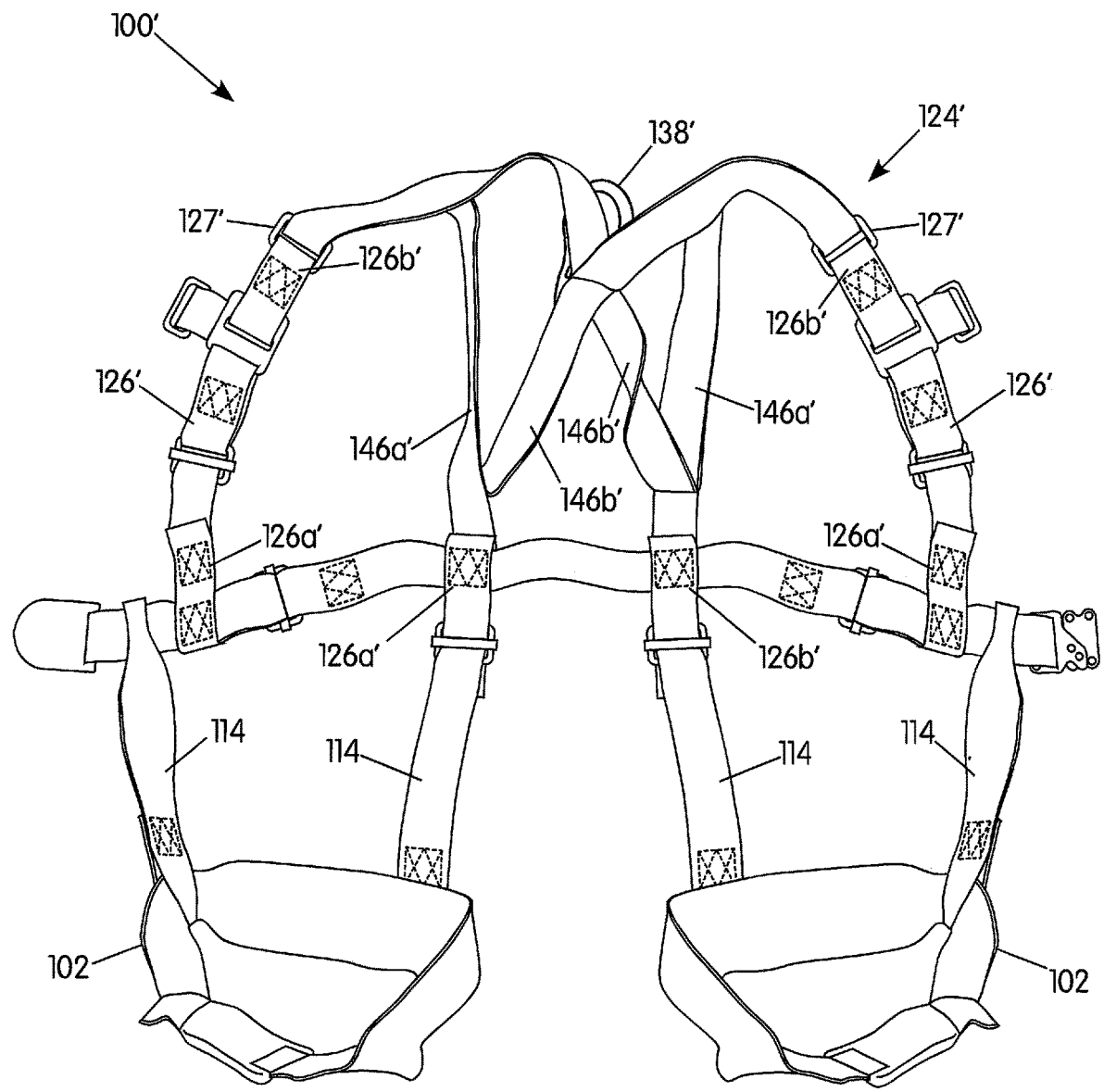
FIG. 6A is a front view of a harness according to the principles of another preferred and non-limiting embodiment or aspect of the present invention.
Figure 6B:
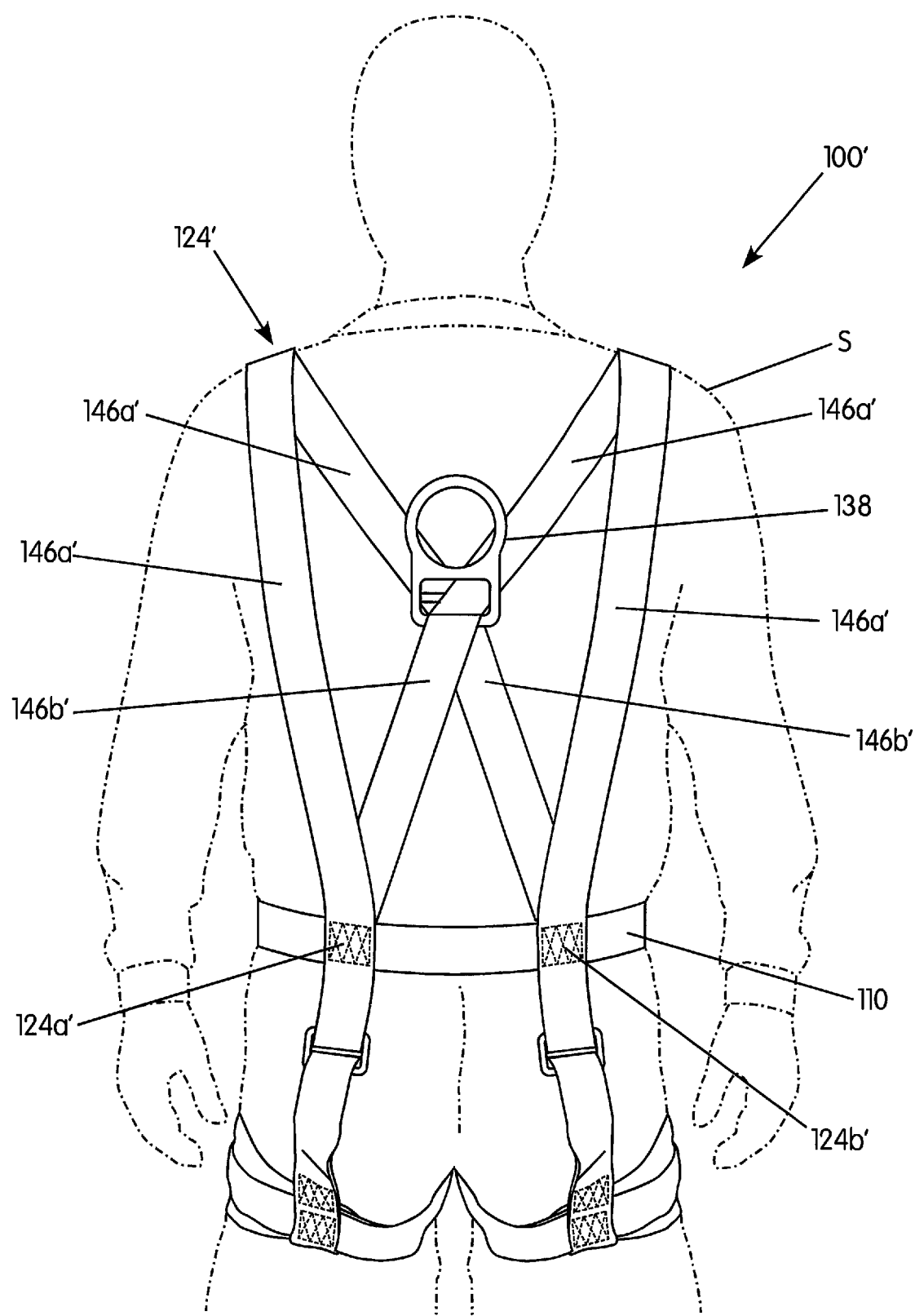
FIG. 6B is a rear view of a user wearing the harness shown in FIG. 6A.
Figure 6C:
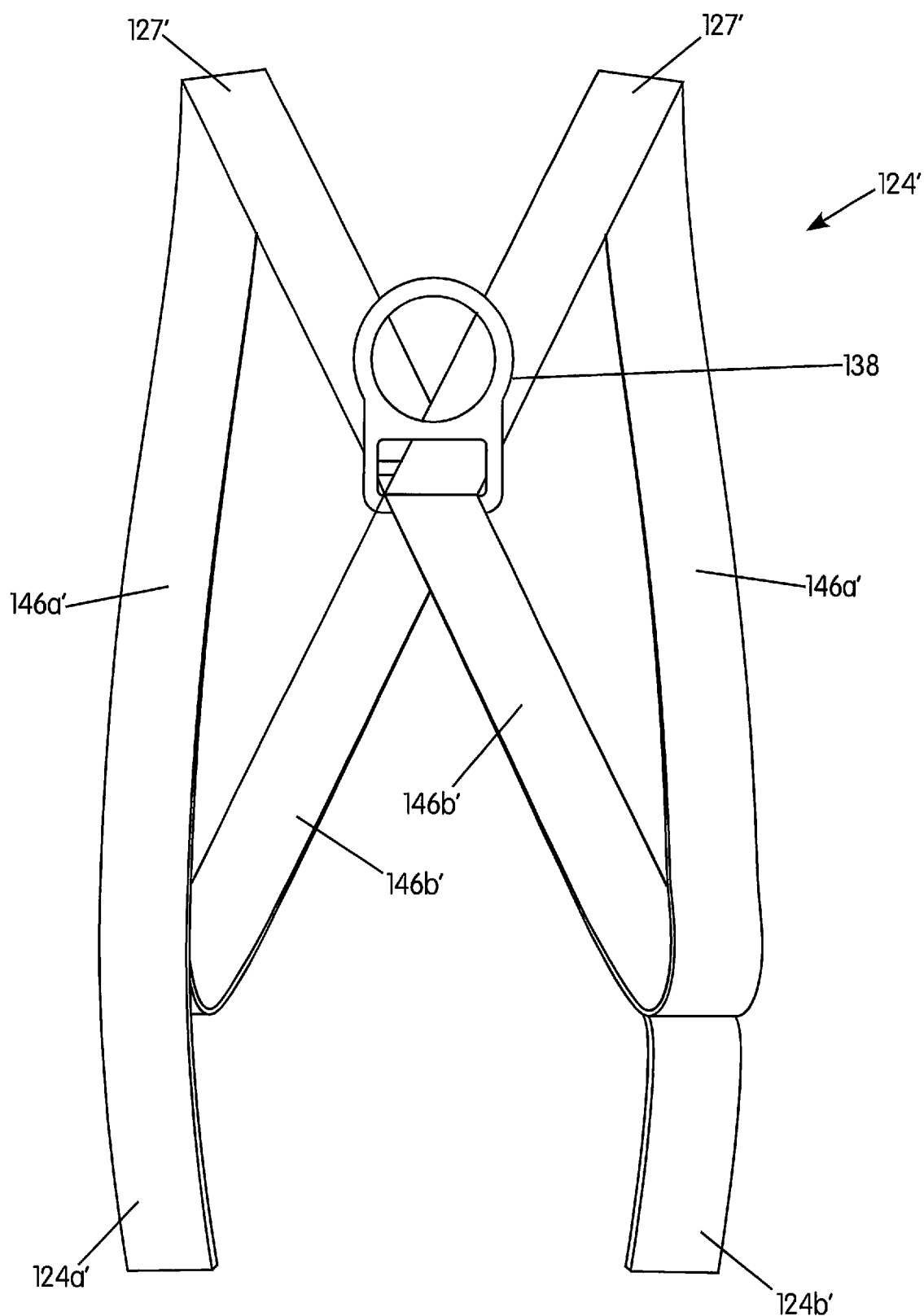
FIG. 6C is a schematic representation of a shoulder strap of the harness shown in FIG. 6A.

With reference to FIGS. 6A-6C, a harness 100' is shown in accordance with another preferred and non-limiting embodiment or aspect of the present invention. The components of the harness 100' shown in FIGS. 6A-6C are substantially similar to the components of the harness 100 described herein with reference to FIGS. 1-5C. Reference numerals in FIGS. 6A-6C are used to illustrate identical components of the corresponding reference numerals in FIGS. 1-5C. As the previous discussion regarding the harness 100 generally shown in FIGS. 1-5C is applicable to the embodiment or aspect of the harness 100' shown in FIGS. 6A-6C, only the relative differences between the two harnesses are discussed hereinafter.

With reference to FIG. 6A, the harness 100' has a shoulder strap 124' configured to extend over at least a portion of the user's shoulders S (shown in FIG. 6B). The shoulder strap 124' may be a pair of shoulder straps connected to the belt strap 110 or another portion of the harness 100' at a front end of the harness 100' by way of a pair of front shoulder connection straps 126'. Each front shoulder connection strap 126' has a first end 126a' that is connected to a first portion of the belt strap 110 at a front end of the belt strap 110 and/or to a first of the pair of front leg connection straps 112. The first end 126a' of the front shoulder connection strap 126' may be directly connected to the front portion of the belt strap 110 and/or the pair of front leg connection straps 112, such as being sewn directly to the belt strap 110 and/or the pair of front leg connection straps 112. The length of the front shoulder connection strap 126 may be fixed (i.e., non-adjustable), or adjustable, such as by an adjustment mechanism similar to the adjustment mechanism 106 described herein with reference to the leg straps 102. The front shoulder connection strap 126' may be formed from a webbing material typically used in harness construction.

With continued reference to FIG. 6A, each front shoulder connection strap 126' further has a second end 126b' that is connected to at least a portion of the shoulder strap 124'. In some preferred and non-limiting embodiments or aspects, the second end 126b' of the front shoulder connection strap 126' may be directly connected to the shoulder strap 124', such as being sewn directly to the shoulder strap 124'. In other preferred and non-limiting embodiments or aspects, the second end 126b' of the front shoulder connection strap 126' may be connected by a connection element 127' having an opening through which the front connection strap 126' and at least a portion of the shoulder strap 124' may be looped.

With reference to FIG. 6B, the shoulder strap 124' has an anchor element, such as a D-ring 138', for connecting at least a portion of the shoulder strap 124' to a line connected to an anchor point. In some preferred and non-limiting embodiments or aspects, at least a portion of the shoulder strap 124' is looped around or otherwise permanently attached to the D-ring 138'. The D-ring 138' may have a structure that is substantially similar or identical to the D-ring 138 described herein with reference to FIG. 2.

With reference to FIGS. 6A-6B, the shoulder strap 124' may be constructed from a tearable webbing material, such as an energy absorbing tear tape, which is formed integrally therewith. For example, the shoulder strap 124' may be made from a webbing material 146' having two webbing components 146a', 146b' (e.g., load-bearing components) that are woven together by binder threads (not shown). The shoulder strap 124' has a first end 124a' and a second end 124b' connected to a rear portion of the belt strap 110. The two webbing components 146a', 146b' are integrally bound together along substantially their entire length, except at the first end 124a' and the second end 124b' of the shoulder strap 124'.

With reference to FIG. 6C, the shoulder strap 124' is looped between the first and second ends 124a', 124b' through the connection elements 127' of each front shoulder connection straps 126' (shown in FIG. 6A) and through a D-ring 138'. In some preferred and non-limiting embodiments or aspects, the first end 124a' and the second end 124b' may be sewn or otherwise connected to the belt strap 110 (shown in FIG. 6B), such as by one of the two webbing components 146a', 146b'. In this manner, one of the two webbing components 146a', 146b' defines the first end 124a' of the shoulder strap 124'. The second ends of the two webbing components 146a', 146b' from each of the first and second ends 124a' 124b' are looped through the D-ring 138' and connected to each other. In this manner, the webbing components 146a', 146b' are arranged in an X-shaped configuration at a rear portion of the harness 100 (FIG. 6B).

The binder threads that connect the webbing components 146a', 146b' may be substantially similar or identical to the binder threads 148 described herein with reference to FIGS. 5A-5C. In another preferred and non-limiting embodiment or aspect, the webbing components 146a, 146b may be bound together by an adhesive, such as glue, that separates when reaching the minimum predetermined force or load. Other suitable bonding means, such as hook-and-loop fasteners, adhesives, or other energy absorbing materials may also be used, either individually or in combination with the binder threads.

When the shoulder strap 124' is activated, such as during a fall event, the binder threads are configured to be torn upon experiencing a force in excess of a predetermined force directed in a vertical direction, thereby allowing the two webbing components 146a', 146b' to tear apart from each other, similar to how the webbing components 146a, 146b shown in FIG. 4 and FIG. 5C are configured to tear away from one another. In some embodiments or aspects, the predetermined force (load) may be in the range of about 310 lbs to about 2,250 lbs. The tearing of the binder threads, and a consequent separation of the webbing components 146a', 146b' continues as long as the force on the harness 100' exceeds the minimum predetermined force and ends when either (1) the webbing components 146a', 146b' reach an ending point; or (2) the force reduces to a point below the minimum predetermined force. As described herein, the minimum predetermined force (load) required to separate the two webbing components 146a', 146b' may be configurable by increasing or decreasing the density of the binder threads per unit area, increasing or decreasing the width of the shoulder strap 124', increasing or decreasing the density of the binder threads along a longitudinal length and/or a lateral length of the shoulder strap 124', and/or selecting a type of thread having specified strength characteristics.

With reference to FIGS. 7A-8B, a harness 100" is shown in accordance with another preferred and non-limiting embodiment or aspect of the present invention. The components of the harness 100" shown in FIGS. 7A-8B are substantially similar to the components of the harness 100 described herein with reference to FIGS. 1-5C and the harness 100' described herein with reference to FIGS. 6A-6C. Reference numerals in FIGS. 7A-8B are used to illustrate identical components of the corresponding reference numerals in FIGS. 1-6C. As the previous discussion regarding the harness 100 and harness 100' generally shown in FIGS. 1-6C is applicable to the embodiment or aspect of the harness 100" shown in FIGS. 7A-8B, only the relative differences between the two harnesses are discussed hereinafter. As in harnesses 100, 100', the harness 100" has an energy absorbing element formed integrally therewith for absorbing a fall of a user wearing the harness 100".

Figure 7A:
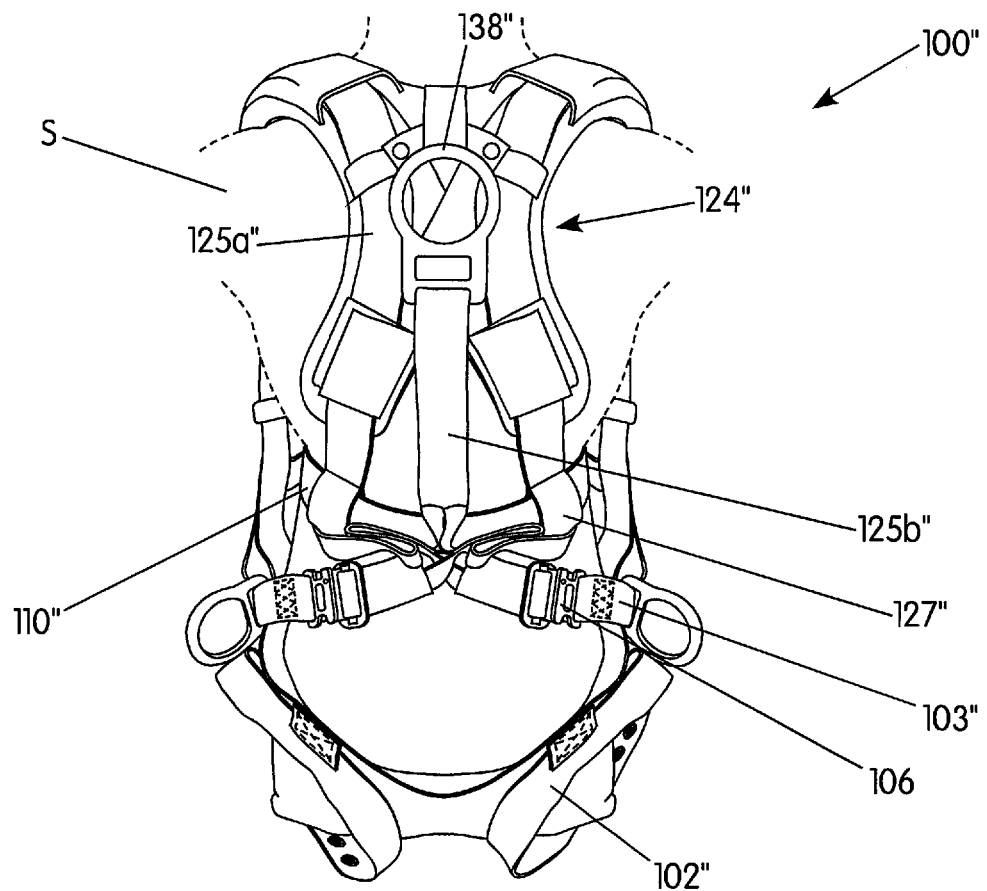
FIG. 7A is a rear view of a harness according to the principles of another preferred and non-limiting embodiment or aspect of the present invention.

With reference to FIG. 7A, the harness 100' has a shoulder strap 124" configured to extend over at least a portion of the user's shoulders S. The shoulder strap 124' may be a pair of shoulder straps connected to at least another portion of the harness 100" at a front end and a rear end of the harness 100". The shoulder strap 124" has an anchor element, such as a D-ring 138", for connecting at least a portion of the shoulder strap 124" to a line connected to an anchor point. The D-ring 138" may have a structure that is substantially similar or identical to the D-ring 138 described herein with reference to FIG. 2. In some preferred and non-limiting embodiments or aspects, at least a portion of the shoulder strap 124" is looped around or otherwise permanently attached to the D-ring 138". For example, with reference to FIGS. 8A-8B, a first portion 125a" of the shoulder strap 124" that overlaps the user's shoulders S (shown in FIG. 7A) and connects to a belt strap 110" at the front portion of the harness 100" may be looped through a first opening 138a" on the D-ring 138". A second portion 125b" of the shoulder strap 124" that connects to an anchoring point of the harness 100" may be looped through a second opening 138b" on the D-ring 138".

Figure 7B:
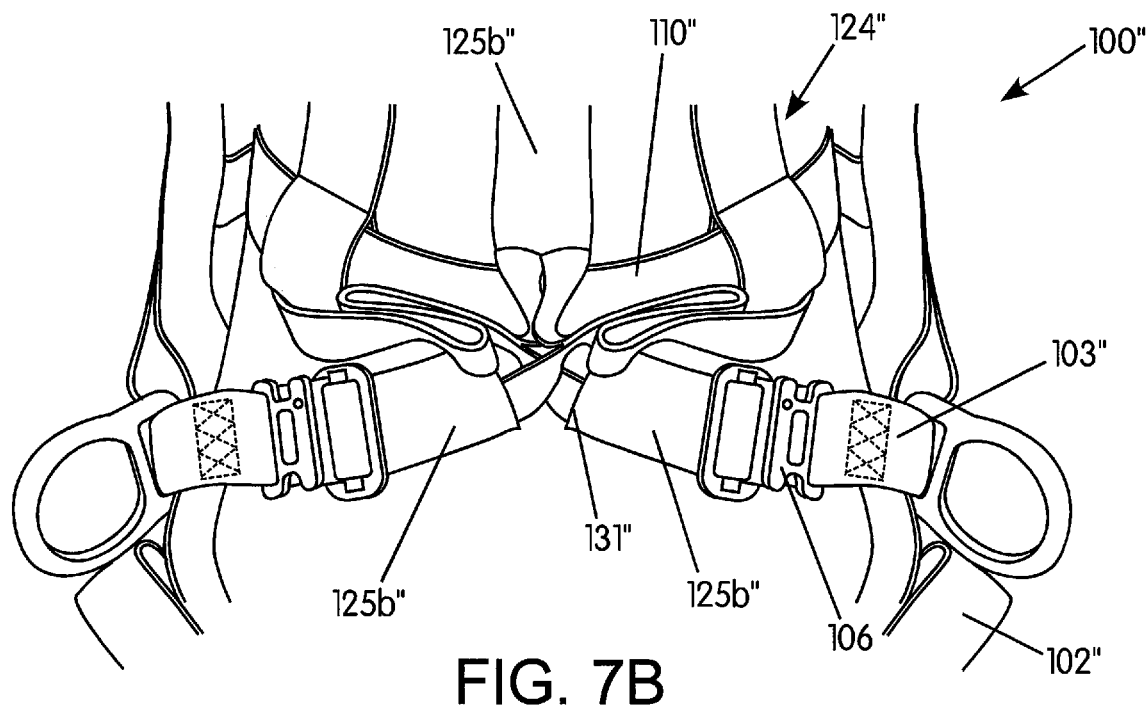
FIG. 7B is a detailed view of an energy absorbing element of the harness shown in FIG. 7A.
Figure 8A:
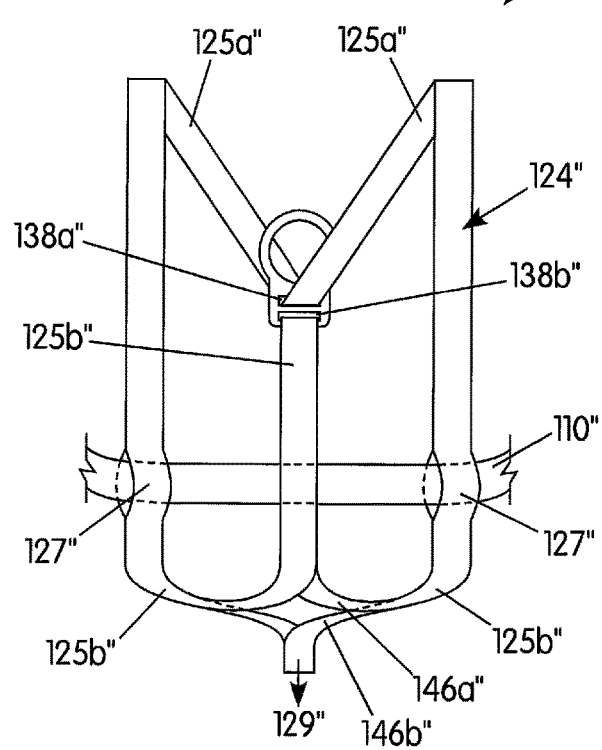
FIG. 8A is a schematic representation of a harness having the energy absorbing element shown in FIG. 7A with the harness shown in an undeployed configuration.
Figure 8B:
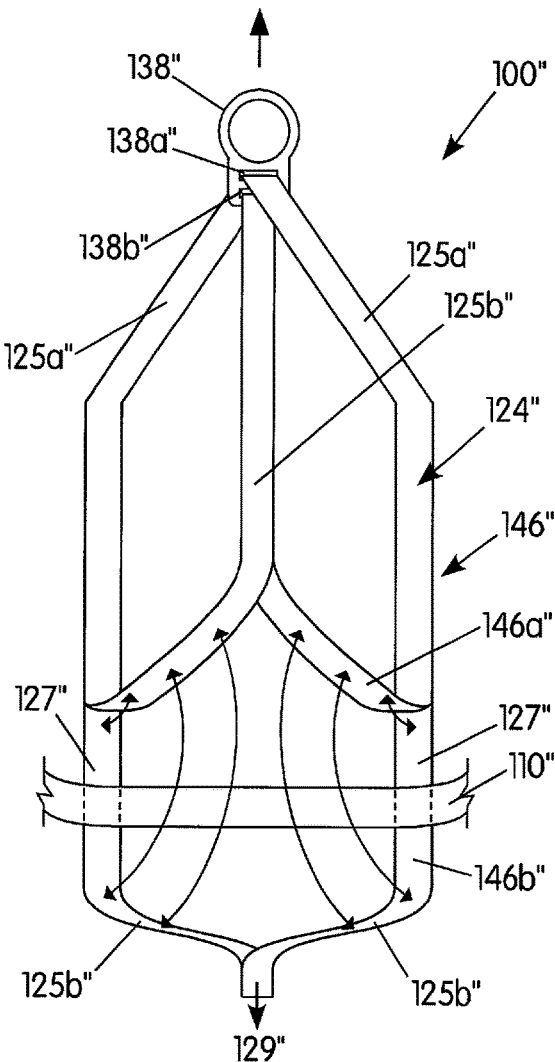
FIG. 8B is a schematic representation of the harness of FIG. 8A in a deployed configuration.

With reference to FIGS. 7A-7B, the anchoring point for connecting the second portion 125b" of the shoulder strap 124" may be a leg strap 102" or a hip strap 103". Instead of being directly connected to the belt strap 110" at the rear end of the harness 100", such as with the harness 100' shown in FIGS. 6A-6C, the second portion 125b" of the shoulder strap 124" may be connected to the leg strap 102" or the hip strap 103", such as being sewn directly to one another. A loop section 127" may be formed in the shoulder strap 124" at the rear end of the harness 100". The loop section 127" may be tearable, as shown in FIG. 7B, when the harness 100" is deployed, such as during a fall event. In some preferred and non-limiting embodiments or aspects, the belt strap 110" and/or other straps of the harness 100" may pass through the loop section 127" of the shoulder strap 124". In some examples, an adjustment mechanism 106" (shown in FIGS. 7A-7B), similar to the adjustment mechanism 106 described herein with reference to the leg straps 102, may be provided for adjusting the length of the second portion 125b" of the shoulder strap 124" and the leg strap 102" or the hip strap 103" to better fit on the user's body. The leg strap 102" or the hip strap 103" may be formed from a webbing material typically used in harness construction.

Similar to the shoulder straps 124, 124' described with reference to FIGS. 1-6C, the shoulder strap 124" may have an energy absorbing element integrally formed therewith. In some preferred and non-limiting embodiments or aspects, the shoulder strap 124" may be constructed from a tearable webbing material, such as an energy absorbing tear tape, which is formed integrally therewith. In other examples, the shoulder strap 124" may have the tearable webbing material that is embedded within a tubular sleeve 131" (shown in FIG. 7B). For example, with reference to FIGS. 8A-8B, the shoulder strap 124" may be made from a webbing material 146" having two webbing components 146a", 146b" (e.g., load-bearing components) that are woven together by binder threads (not shown). The two webbing components 146a", 146b" are integrally bound together along substantially their entire length, except at a portion of the shoulder strap 124" proximate to the second portion 125b" and at the looped portion 127".

The binder threads that connect the webbing components 146a", 146b" may be substantially similar or identical to the binder threads 148 described herein with reference to FIGS. 5A-5C. In another preferred and non-limiting embodiment or aspect, the webbing components 146a", 146b" may be bound together by an adhesive, such as glue, that separates when reaching the minimum predetermined force or load. Other suitable bonding means, such as hook-and-loop fasteners, adhesives, or other energy absorbing materials may also be used, either individually or in combination with the binder threads.

When the shoulder strap 124" is activated, such as during a fall event, the binder threads are configured to be torn upon experiencing a force in excess of a predetermined force directed in a vertical direction, thereby allowing the two webbing components 146a", 146b" to tear apart from each other, similar to how the webbing components 146a, 146b shown in FIG. 4 and FIG. 5C are configured to tear away from one another. In some embodiments or aspects, the predetermined force (load) may be in the range of about 310 lbs to about 2,250 lbs. The tearing of the binder threads, and a consequent separation of the webbing components 146a", 146b" continues as long as the force on the harness 100" exceeds the minimum predetermined force and ends when either (1) the webbing components 146a", 146b" reach an ending point; or (2) the force reduces to a point below the minimum predetermined force. As described herein, the minimum predetermined force (load) required to separate the two webbing components 146*a*", 146*b*" may be configurable by increasing or decreasing the density of the binder threads per unit area, increasing or decreasing the width of the shoulder strap 124", increasing or decreasing the density of the binder threads along a longitudinal length and/or a lateral length of the shoulder strap 124", and/or selecting a type of thread having specified strength characteristics.

With the construction of the shoulder strap 124" shown in FIGS. 7A-8B, a length of the shoulder strap 124" is extended to reach below the belt strap 110" compared to the shoulder strap 124' shown in FIGS. 6A-6C, where the shoulder strap 124' is anchored to the belt strap 110'. As described herein, the additional length of the shoulder strap 124" that extends beyond the belt strap 110" may be used to support a heavier user due to an additional distance over which an energy absorbing element of the shoulder strap 124" may be activated. The additional length of the shoulder strap 124" from the loop section 127" to the anchor point 129" connected to the leg strap 102" or the hip strap 103" provides additional energy absorbing material that may be torn to lessen the force of a fall even that is transmitted to the user wearing the harness 100". During a fall event, a force F, shown in FIG. 8B, pulls the D-ring 138" in an upward direction. Because the second portion 125*b*" of the shoulder strap 124" is connected directly to the D-ring 138", the webbing components 146*a*", 146*b*" at the second portion 125*b*" are separated from one another starting in a region below the belt strap 110. The webbing components 146*a*", 146*b*" may continue tearing apart from one another past the loop section 127" as long as the force F exceeds the minimum predetermined force.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A harness removably attachable to a body of a user, the harness having a plurality of straps, comprising:
    a shoulder strap configured to extend over at least a portion of a user's shoulders, the shoulder strap having a first end and a second end fixedly connected to each other to form a continuous loop defining a pair of straps with a front portion of the loop looped through an opening of a front connection element connected to a front portion of a belt strap and a rear portion of the loop looped through an opening of a rear connection element connected to a rear portion of the belt strap,
    wherein each of the pair of straps comprises an energy absorbing element formed integrally therewith, the energy absorbing element having a tearable webbing material with at least two bound webbing components configured to tear from one another when the shoulder strap is subjected to a force that exceeds a predetermined threshold, and
    wherein a first of the at least two bound webbing components of each of the pair of straps is connected to a common anchor element.

2. The harness of claim 1, wherein the at least two bound webbing components are bound by a plurality of binder threads.

3. The harness of claim 2, wherein the plurality of binder threads are configured to tear successively in a longitudinal direction of the shoulder strap when the shoulder strap is subjected to the force that exceeds the predetermined threshold.

4. The harness of claim 2, wherein the plurality of binder threads extend through at least a portion of a thickness of the at least two webbing components.

5. The harness of claim 2, wherein the plurality of binder threads are arranged in two or more rows extending along a longitudinal length or a lateral length of the webbing components.

6. The harness of claim 5, wherein the rows are substantially parallel to each other.

7. The harness of claim 5, wherein the rows intersect with each other at least once over the longitudinal length or the lateral length of the webbing components.

8. The harness of claim 2, wherein the plurality of binder threads are arranged in two or more thread groups spaced apart from each other along a longitudinal length or a lateral length of the webbing components.

9. The harness of claim 8, wherein the two or more thread groups are arranged in a pattern.

10. The harness of claim 2, wherein a density of the plurality of binder threads increases from a rear portion to a front portion of the shoulder strap.

11. The harness of claim 1, wherein the predetermined threshold is in the range of about 310 lbs to about 2,250 lbs.

12. The harness of claim 1, wherein the at least two bound, load-bearing webbing components are bound together by an adhesive.

13. The harness of claim 1, wherein the shoulder strap has a starting tear point at a rear portion where the at least two bound, load-bearing webbing components are unbound.

14. The harness of claim 1, wherein the shoulder strap has an ending tear point having a reinforced area configured to prevent separation of the at least two bound, load-bearing webbing components.

15. The harness of claim 1, wherein the energy absorbing element is formed on an energy absorbing area at a rear portion of the shoulder strap.

16. The harness of claim 1, wherein the anchor element a frame with a first opening for receiving the first of the at least two bound webbing components of each of the pair of straps and a second opening for connecting to a line connected to an anchor point.

17. A harness removably attachable to a body of a user, the harness having a plurality of straps comprising:
    a shoulder strap configured to extend over at least a portion of a user's shoulders, the shoulder strap having a first end and a second end fixedly connected to each other to form a continuous loop defining a pair of straps with a front portion of the loop looped through an opening of a front connection element connected to a front portion of a belt strap and a rear portion of the loop looped through an opening of a rear connection element connected to a rear portion of the belt strap,
    wherein each of the pair of straps comprises an energy absorbing element formed integrally therewith on an energy absorbing area at the rear portion of the loop, the energy absorbing element having a tearable webbing material with at least two bound webbing components configured to tear from one another when the shoulder strap is subjected to a force that exceeds a predetermined threshold, wherein a first of the at least two bound webbing components of each of the pair of straps is connected to a common anchor element, and wherein the at least two bound webbing components are bound by a plurality of binder threads configured to tear successively in a longitudinal direction of the shoulder strap when the shoulder strap is subjected to the force.

18. The harness of claim 17, wherein the shoulder strap has a starting tear area at the rear portion of the loop where the at least two bound webbing components are unbound.

19. At least one strap in a harness removably attachable to a body of a user, the at least one strap comprising:
a shoulder strap configured to extend over at least a portion of a user's shoulders, the shoulder strap having a first end and a second end fixedly connected to each other to form a continuous loop defining a pair of straps with a front portion of the loop configured for being looped through an opening of a front connection element connected to a front portion of a belt strap and a rear portion of the loop configured for being looped through an opening of a front connection element connected to a rear portion of the belt strap, wherein each of the pair of straps comprises an energy absorbing element formed integrally therewith, the energy absorbing element having a tearable webbing material with at least two bound webbing components configured to tear from one another when the shoulder strap is subjected to a force that exceeds a predetermined threshold, and wherein a first of the at least two bound webbing components of each of the pair of straps is connected to a common anchor element.

20. The strap of claim 19, wherein the at least two bound webbing components are bound by a plurality of binder threads configured to tear successively in a longitudinal direction of the shoulder strap when the shoulder strap is subjected to the force that exceeds the predetermined threshold.

* * * * *